Patented Apr. 15, 1947

2,419,082

UNITED STATES PATENT OFFICE 2,419,082

UNSATURATED ETHERS OF CYCLIC SULFONES

Rupert C. Morris, Berkeley, and Edward C. Shokal, Oakland, Calif., assignors to Shell Development Company, San Francisco, Calif., a corporation of Delaware No Drawing. Application June 6, 1942, Serial No. 446,130

5 Claims. (Cl. 260—329)

This invention relates to a novel and particularly useful class of compounds. More particularly, the invention pertains to unsaturated ethers of cyclic sulfones. Specifically, the invention relates to unsaturated ethers of 3-hydroxy thiolane-1,1-dioxide and substituted 3-hydroxy thiolane-1,1-dioxides.

It is an object of the present invention to provide a new class of chemical compounds. A further object of the invention is to provide a class of compounds with unexpectedly useful properties. Other objects will be apparent from the description of the invention given hereinafter.

Ethers of the class of 3-alkoxy tetramethylene sulfone are disclosed and some members of this class are described in U. S. Patent 2,219,006. In the compounds disclosed in the patent, the radical which is attached by ether linkage to the cyclic sulfone group is a saturated alkyl radical. We have now prepared compounds wherein the radical joined to a cyclic sulfone group by an ether linkage is an unsaturated radical. Surprisingly, it has been found that these unsaturated compounds of the invention possess inherent properties which unexpectedly are markedly superior to those of the corresponding saturated compounds. These properties could not be foreseen and they are of such a nature that they make the compounds of the invention particularly useful in various applications.

Broadly, the new compounds of the invention are unsaturated ethers of cyclic sulfones wherein the cyclic sulfone group contains four carbon atoms in the heterocyclic ring. This class of compounds is represented by the following general structural formula:

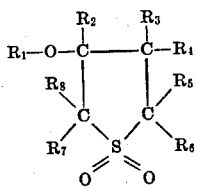

wherein $R_1$ designates a radical containing an unsaturated aliphatic carbon atom and $R_2$, $R_3$, $R_4$, $R_5$, $R_6$, $R_7$ and $R_8$ are each a member of the group consisting of a hydrogen atom and halogen atom such as a chlorine atom, a bromine atom or an iodine atom, and an organic radical, preferably a hydrocarbon radical such as an alkyl group, an alkenyl group, an alicyclic group, an aryl group, an aralkyl group and the like.

The compounds of the invention are termed unsaturated ethers of 3-hydrox thiolane-1,1-dioxide in conformity with the outline of nomenclature for compounds of this type of ring structure given on page 44 of Patterson and Capell, The Ring Index, Reinhold Publishing Corp., New York, 1940; Am. Chem. Soc. Monograph No. 84. The numbering system of the thiolane ring is as indicated below:

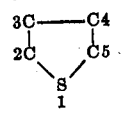

The system is exemplified by the compound of the structure:

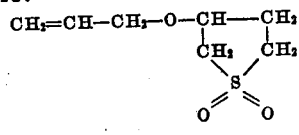

which is named the allyl ether of 3-hydroxy thiolane-1,1-dioxide and the compound of the formula:

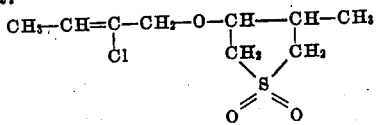

which is called 2-chloro-2-butenyl ether of 3-hydroxy-4-methyl thiolane-1,1-dioxide.

While the group $R_1$ of the general structural formula given above for the compounds of the invention represents any unsaturated radical containing an unsaturated aliphatic carbon atom, a particularly important group of the class are those wherein $R_1$ is an unsaturated hydrocarbon radical, particularly an allylic alkenyl group. By an allylic alkenyl group, reference is made to those unsaturated hydrocarbon groups which have the olefinic group directly linked to the carbon atom possessing the free bond of said allylic alkenyl group. An allylic alkenyl group may also be termed an alkene-2-yl-1 group. The simplest member of this group of compounds is the allyl ether of 3-hydroxy thiolane-1,1-dioxide. This compound is of special interest as a softener of synthetic rubber for several reasons. It is well known that synthetic rubbers comprising copolymers of butadiene require softeners to be incorporated therewith in order to facilitate working, milling and application thereof. For this purpose, the allyl ether of 3-hydroxy thiolane-1,1-dioxide is outstanding because of its properties which give an easily milled material as well as a finished product of very desirable characteristics. Another reason that the compound is attractive for use is because of the ready availability of the raw materials used in its manufacture. Thus the compound is prepared from butadiene, sulfur dioxide and allyl alcohol. The butadiene is one of the materials used by manufacturers in producing synthetic rubber, while the sulfur dioxide and allyl alcohol are obtainable at low cost. Further, it is not necessary that the compound be prepared from butadiene of high purity (98% or higher) since the compound can be synthesized from a starting material of butadiene in admixture with other materials which mixture is of low grade and the butadiene therein is separable as a substantially pure substance only with difficulty. For example, butadiene-containing mixtures having a butadiene content of 30% or possibly lower are operative as a starting material.

The unsaturated ethereal compounds of the invention are prepared by an addition reaction of the corresponding unsaturated alcohols to an unsaturated cyclic sulfone containing four carbon atoms in the heterocyclic ring. The reaction is preferably effected with the aid of a catalyst. For example, in the preparation of the allyl ether of 3-hydroxy thiolane-1,1-dioxide, allyl alcohol is reacted with 3-thiolene-1,1-dioxide ($\beta$-butadiene sulfone), the reaction being effected preferably in the presence of a strong base such as sodium hydroxide. This preferable catalytic reaction may be represented by the following equation:

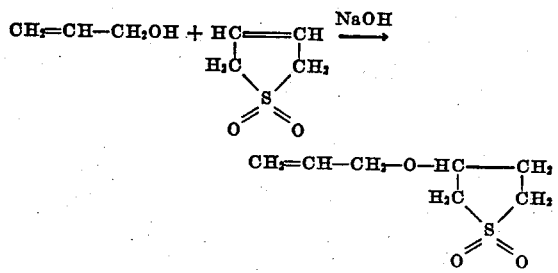

If desired, we have discovered that the reaction may be effected by starting with 2-thiolene-1,1-dioxide ($\alpha$-butadiene sulfone) rather than the isomeric 3-thiolene-1,1-dioxide and this discovery applies in general to all of the cyclic sulfone starting materials. The $\alpha$-butadiene sulfone is a particularly desirable starting material in that we have discovered that it is markedly more stable than $\beta$-butadiene sulfone. Thus, the reaction with $\beta$-butadiene sulfone is limited to about 120° C. at atmospheric pressure above which temperature extensive decomposition of the sulfone occurs. By starting with the isomeric $\alpha$-butadiene sulfone, the reaction may be effected at a temperature of 150° C. without decomposition of the sulfone, resulting in a substantial increase of reaction velocity and saving in time for manufacture of the compounds of the invention.

The reaction occurs at room temperature, i. e. 20°–25° C. with 3-thiolene-1,1-dioxide as shown in U. S. Patent 2,219,006. However, when higher homologous thiolene-1,1-dioxides are employed as the reactant, we have discovered that the product cannot be prepared under the conditions shown by this patent. When the reaction is attempted at room temperature as taught by the patent, it was found that the reactants are recovered unchanged, i. e. no reaction had occurred. In order for the products of the higher cyclic sulfones to be prepared, such as 3-methyl-3-thiolene-1,1-dioxide ($\beta$-isoprene sulfone), it is necessary that a temperature of 60° or higher be employed to obtain the desired ether. It is of course desirable that the temperature be not so high that appreciable decomposition of the unsaturated cyclic sulfone occurs. A catalyst is preferably used to effect the reaction, and for this purpose a strong base such as an alkali metal hydroxide or alkali metal alcoholate is used.

The preparation of the unsaturated cyclic sulfones used as reactants in the synthesis of the invented compounds is described in part, for example, in British Patent 361,341; German Patent 236,386; German Patent 506,839 and by Backer and Strating in Rec. trav. chim. 53, 525–543 (1934). The starting materials for the compounds of the invention are reaction products of diene hydrocarbons (including halogenated diene hydrocarbons such as chloroprene, for example) with sulfur dioxide.

The unsaturated ethers of 3-hydroxy thiolane-1,1-dioxide and of 3-hydroxy substituted thiolane-1,1-dioxide of the invention are represented by the general formula

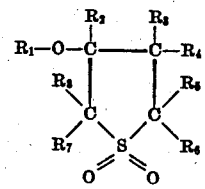

For the compounds of the invention, $R_1$ represents any unsaturated radical containing an unsaturated aliphatic carbon atom including such groups, for example, as allyl, crotyl, methyl vinyl carbinyl (butene-1-yl-3 or $\alpha$-methylallyl), butenyl, pentenyl, hexenyl, methallyl ($\beta$-methylallyl), 2-chlorallyl, propargyl, cinnamyl, cyclopentenyl, cyclohexenyl, isopentenyl, 3-chlorallyl, 2-phenylallyl, octenyl, nonenyl, oleyl, phenyl vinyl carbinyl (3-phenylpropene-1-yl-3 or $\alpha$-phenylallyl), 2-bromocrotyl, 3-cyanoallyl, and the like as well as unsaturated groups of the type

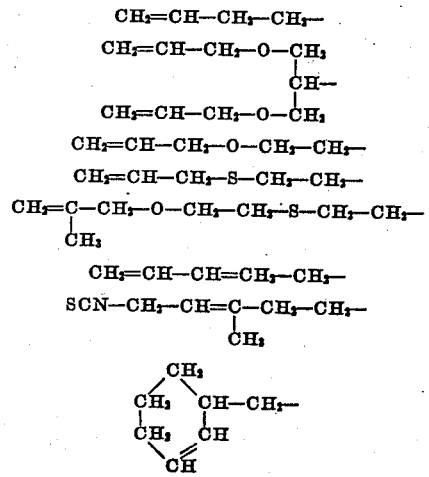

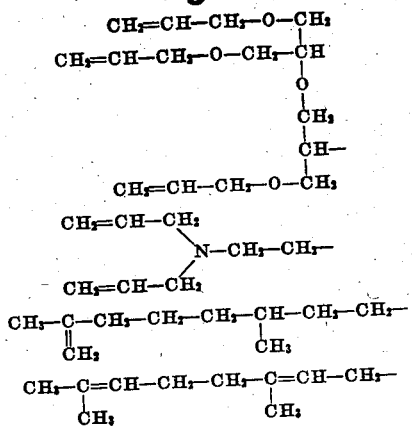

The symbols $R_2$, $R_3$, $R_4$, $R_5$, $R_6$, $R_7$ and $R_8$ represent the same or different atoms or groups such as hydrogen atoms, halogen atoms or organic radicals which are preferably hydrocarbon radicals. Excluded from the scope of the invention are those compounds wherein $R_1$ represents a phenyl group since a phenyl group is not an aliphatically unsaturated radical. Thus a phenyl group does not possess the necessary aliphatic unsaturation within the meaning of the term unsaturation as used in this specification and the appended claims, and it is the presence of the unsaturated group or groups containing an unsaturated aliphatic carbon atom which gives the compounds of the invention their characteristic superior properties as compared to similar cyclic sulfone ethers devoid of the unsaturation. It will be understood, however, that those compounds which possess aliphatically unsaturated groups in addition to a phenyl group are not to be construed as excluded from the scope of the invention. Reference is made, for example, to a compound such as the cinnamyl ether of 3-hydroxy thiolane-1,1-dioxide.

As examples of particular new compounds included within the scope of the invention are allyl ether of 3-hydroxy thiolane-1,1-dioxide, methallyl ether of 3-hydroxy thiolane-1,1-dioxide, allyl ether of 3-hydroxy-4-methyl thiolane-1,1-dioxide, 2-chlorallyl ether of 3-hydroxy-5,5-dimethyl thiolane-1,1-dioxide, cyclopentenyl ether of 3-hydroxy-4-chloro-thiolane-1,1-dioxide, methyl vinyl carbinyl ether of 3-hydroxy thiolane-1,1-dioxide, allyl ether of 3-hydroxy-2,2-dimethyl thiolane-1,1-dioxide and the like, as well as such compounds as are representable by the formulas:

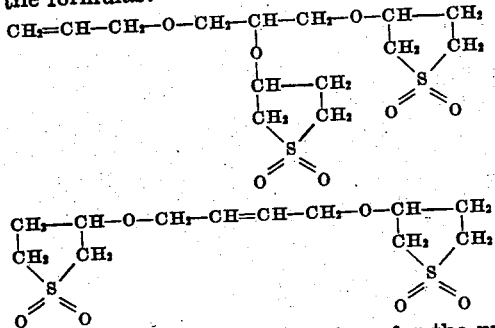

The following examples are given for the purpose of further illustrating the invention:

Example I

As an example of an allyl ether, the allyl ether of 3-hydroxy thiolane-1,1-dioxide was prepared. To a solution of 47 grams KOH (0.83 mol) in 1029 grams of allyl alcohol (17.7 mols) was slowly added with stirring 1026 grams of 3-thiolene-1,1-dioxide (8.68 mols). The reaction was exothermic and the addition of the thiolene dioxide was so regulated that the temperature of the mixture did not exceed about 36° C. After addition was complete, the reaction mixture was allowed to stand at room temperature for 45 hours. The solution was neutralized with hydrochloric acid, the precipitated salt filtered from the mixture, and the filtrate distilled at reduced pressure. There was obtained a 94.5% yield of the allyl ether which had the following constants:

| | |
|---|---|
| Boiling point | 134–6° C. at 1.5 mm. |
| Specific gravity, 20/4 | 1.2168 |
| Refractive index, 20/D | 1.4935 |
| Carbon | 47.66% |
| Theory | 47.7% |
| Hydrogen | 6.88% |
| Theory | 6.86% |
| Sulfur | 18.15% |
| Theory | 18.19% |

Example II

An ether containing an unsaturated branched-chain group was prepared by the use of methallyl (beta-methylallyl) alcohol. About 22 grams NaOH (0.53 mol) were dissolved at 90° C. in 1008 grams of methallyl alcohol (14.0 mols) and the solution was cooled down to room temperature. About 829 grams 3-thiolene-1,1-dioxide (7.02 mols) were added portionwise to the solution. The reaction mixture was then allowed to stand about 48 hours at room temperature. It was neutralized with hydrochloric acid to bromthymol blue and the mixture was washed with three portions of 2000 cc. of water. The residue was then distilled under vacuum and a yield of 73.5% of the methallyl ether of 3-hydroxy thiolane-1,1-dioxide was obtained which had the following constants:

| | |
|---|---|
| Boiling point | 135–140° C. at 1.5 mm. |
| Specific gravity, 20/4 | 1.1769 |
| Refractive index, 20/D | 1.4916 |
| Carbon | 50.41% |
| Theoretical | 50.5% |
| Hydrogen | 7.40% |
| Theoretical | 7.41% |
| Sulfur | 17.0% |
| Theoretical | 16.85% |

Example III

A higher unsaturated ether was prepared from a nonenyl alcohol obtained by substitutively chlorinating a propylene polymer and hydrolyzing the product. To a stirred solution of 17 grams of NaOH (0.425 mol) in 1490 grams of C$_9$ unsaturated alcohols (10.49 mols) was added 670 grams of 3-thiolene-1,1-dioxide (5.68 mols). The mixture was allowed to stand at room temperature for 48 hours. The reaction was then neutralized with hydrochloric acid to bromthymol blue and filtered. The filtrate was washed three times with 2000 cc. of water each time and then the raffinate was distilled from a Claisen flask. About 667 grams of product was recovered which had the following properties:

| | |
|---|---|
| Boiling point | 168–177° at 1.5 mm. |
| Specific gravity, 20/4 | 1.0668 |
| Refractive index, 20/D | 1.4848 |
| Carbon | 59.5% |
| Theory | 59.4% |
| Hydrogen | 9.2% |
| Theory | 9.6% |
| Sulfur | 12.5% |
| Theory | 12.28% |

While the products of the invention are particularly useful for plasticizers and tackifiers in natural and synthetic rubber compositions, they are also useful in a variety of other applications. They are of value in the resin and lacquer industry as solvents and plasticizers for the manufacture of dopes, fabric coatings, sprays and moulding compositions. Other uses are as insecticides, antioxidants, pourpoint depressants, extracting agents, ingredients in cosmetics, as base materials and fixing agents in the preparation of perfumes, as softening agents for the leather industry and as selective solvents in extractive distillation processes.

A comparison of the properties of the allyl ether of 3-hydroxy thiolane-1,1-dioxide with 2 saturated ethers, i. e. the methyl ether and the decyl ether of 3-hydroxy thiolane-1,1-dioxide, demonstrates the unexpected superiority of the compounds of the invention. A composition of synthetic rubber was prepared according to the following formula:

| | Parts by weight |
|---|---|
| Hycar O. R. (copolymer of butadiene and acrylonitrile) | 100 |
| Channel black | 50.0 |
| Zinc oxide | 5.0 |
| Agerite power (phenyl-β-naphthylamine) | 1.0 |
| Stearic acid | 0.5 |
| Softener (ether of 3-hydroxy thiolane-1,1-dioxide) | Varied |
| Altax (benzothiazyl disulfide) | 1.25 |
| Sulfur | 1.25 |

The softener was incorporated in the composition on a rubber mill. The properly mixed material was then vulcanized at 153° C. for 30 minutes. Properties of the vulcanized and unvulcanized compositions using the different ethers are listed below:

| Softener | Allyl ether of 3-hydroxy thiolane-1,1-dioxide | | Methyl ether of 3-hydroxy thiolane-1,1-dioxide | | Decyl ether of 3-hydroxy thiolane-1,1-dioxide | |
|---|---|---|---|---|---|---|
| Parts per 100 parts Hycar O. R. | 15 | 25 | 15 | 25 | 15 | 25 |
| Unvulcanized Compound: | | | | | | |
| Tackiness | Fair | Good | Poor | Fair | Poor | Fair |
| Plasticity Number | 20 | 15 | ------ | 19 | 28 | 22 |
| Vulcanized Compound: | | | | | | |
| Tensile Strength, lbs./sq. in | 2,676 | 1,824 | 3,266 | 2,830 | 3,540 | 3,260 |
| Percent Ultimate Elongation | 621 | 635 | 485 | 497 | 455 | 514 |
| Modulus at 300% Elongation, lbs./sq. in | 930 | 540 | 1,630 | 1,320 | 1,960 | 1,420 |

Synthetic rubbers, unlike natural rubber, lack tackiness, which is essential for the material to adhere to tire fabrics, for instance, and this is one of the reasons that a softener is used with synthetic rubbers. The superior tackiness of the compositions containing the allyl ether of 3-hydroxy thiolane-1,1-dioxide as compared to the compositions containing the corresponding methyl ether or decyl ether is evident from the above results. The plastictiy number is a measure of the plastic properties of the composition. The number indicated is the load required to cause a deformity of 0.10 inches in 30 seconds on a Scott Plastometer. A low number for a given weight of softener is sought.

For vulcanized samples, the percentage ultimate elongation indicates the extent to which a sample is stretched at breaking. When a load is applied a high value indicates good elasticity, the modulus at 300% elongation is the load which is required to stretch the sample 300% and the lowest value for a given weight of softener indicates the best softener.

We claim as our invention:

1. Allyl ether of 3-hydroxy thiolane-1,1-dioxide of the formula:

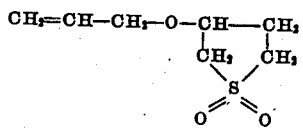

2. Methallyl ether of 3-hydroxy thiolane-1,1-dioxide of the formula:

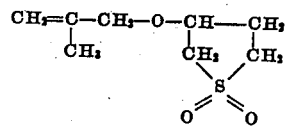

3. Methyl vinyl carbinyl ether of 3-hydroxy thiolane-1,1-dioxide of the formula:

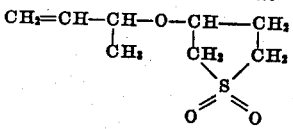

4. A butenyl ether of 3-hydroxy thiolane-1,1-dioxide of the formula:

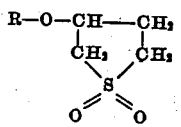

wherein R is a butenyl group.

5. An alkenyl ether of 3-hydroxy thiolane-1,1-dioxide of the formula:

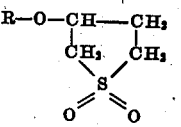

wherein R is an alkenyl group.

RUPERT C. MORRIS.
EDWARD C. SHOKAL.

REFERENCES CITED

The following references are of record in the file of this patent:

UNITED STATES PATENTS

| Number | Name | Date |
|---|---|---|
| 2,291,798 | Delfs | Aug. 4, 1942 |
| 2,219,006 | Delfs | Oct. 22, 1940 |
| 1,925,389 | Jaeger | Sept. 5, 1933 |
| 1,834,621 | Jaeger | Dec. 1, 1931 |

FOREIGN PATENTS

| Number | Country | Date |
|---|---|---|
| 489,974 | British | Aug. 8, 1938 |